United States Patent [19]

Umehara

[11] Patent Number: 4,844,379
[45] Date of Patent: Jul. 4, 1989

[54] SLENDER PIPE FIXING CLAMP

[76] Inventor: Kazumasa Umehara, 607-2, Yoshida, Ohhito-cho, Tagata-gun, Shizuoka Prefecture, Japan

[21] Appl. No.: 185,960

[22] Filed: Apr. 25, 1988

[51] Int. Cl.⁴ .............................................. F16L 3/12
[52] U.S. Cl. ................................................. 248/74.3
[58] Field of Search .................... 248/67.5, 74.1, 74.4, 248/74.5, 316.1, 316.5, 316.6, 505, 62, 74.3; 24/16 PB, 16 R, 17 AP, 135 R, 135 N, 457, 458

[56] References Cited

U.S. PATENT DOCUMENTS

| | | | |
|---|---|---|---|
| Re. 22,846 | 2/1947 | Morehouse | 248/74.3 |
| 2,338,006 | 12/1943 | Morehouse | 248/74.3 |
| 2,379,893 | 7/1945 | Ellinwood | 248/74.3 |
| 2,397,279 | 3/1946 | Vesconte | 248/74.3 |
| 2,415,517 | 2/1947 | Morehouse | 248/74.3 |
| 2,417,261 | 3/1947 | Morehouse | 248/316.1 |
| 2,455,598 | 12/1948 | Michalenko | 248/74.3 |
| 3,049,771 | 8/1962 | Litwin | 24/16 PB |
| 3,376,004 | 4/1968 | Goldman | 24/16 R |
| 4,674,720 | 6/1987 | Fetsch | 248/74.1 |

FOREIGN PATENT DOCUMENTS

| | | | |
|---|---|---|---|
| 507844 | 11/1954 | Canada | 248/74.3 |
| 85618 | 8/1983 | European Pat. Off. | 248/74.1 |
| 2591709 | 6/1987 | France | 248/74.1 |
| 597259 | 1/1948 | United Kingdom | 248/74.3 |

Primary Examiner—Ramon O. Ramirez
Assistant Examiner—Robert A. Olson

[57] ABSTRACT

Herein disclosed is a slender pipe fixing clamp which comprises a clamp device made of a metal strip and including: a clamping wall curved widthwise from the longitudinally central portion of the metal strip; and a pair of flat walls extending in a face-to-face relation from the two ends of the clamping wall and having mounting through holes generally registered with each other. A retaining hole is formed in one of the flat walls in the vicinity of the root of the clamping wall whereas a retaining tongue is raised from the other of the flat walls such that it can be removably retained through the retaining hole.

6 Claims, 1 Drawing Sheet

U.S. Patent  Jul. 4, 1989  4,844,379
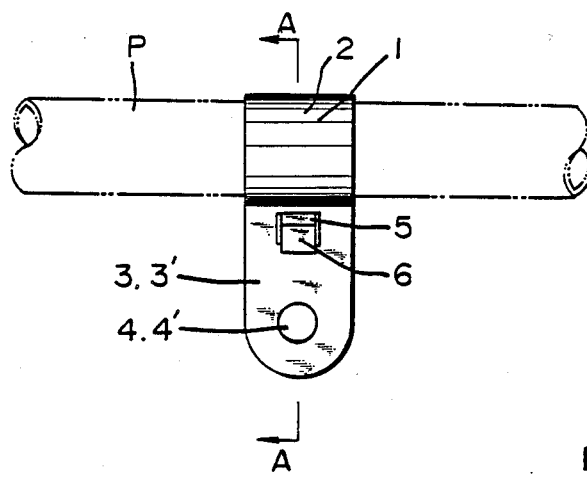
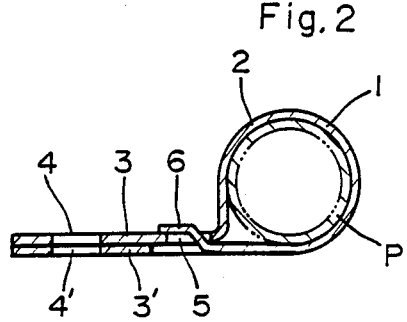
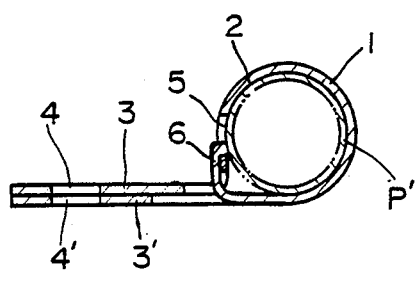
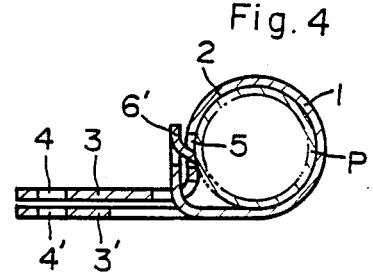
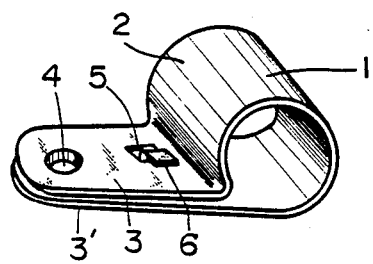
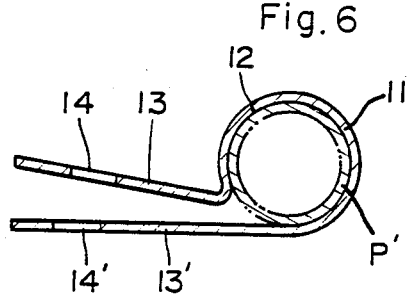
PRIOR ART 4,844,379

SLENDER PIPE FIXING CLAMP

BACKGROUND OF THE INVENTION

1. Field of the Invention

The present invention relates to a pipe clamp and, more particularly, to an improvement in the structure of a pipe clamp for fixing a relatively slender metal pipe or resin tube of a diameter less than 30 mm, which is arranged as a conduit for feeding oil or air in an automobile or various machines or facilities.

2. Description of the Prior Art

In one of the pipe clamps of this kind according to the prior art, as shown in FIG. 6, a clamp device 11 is constructed of: a clamping wall 12 curved widthwise from the longitudinally central portion of a metal strip for clamping a pipe P'; and flat walls 13 and 13' extending in a face-to-face relation from the two ends of said clamping wall 12 and formed with mounting through holes 14 and 14' generally registered with each other.

However, the pipe clamp of the prior art specified above is accompanied by the following defect. When the clamp device 11 is to be used for mounting the pipe P' in position, the flat walls 13 and 13' in the vicinity of its two ends have to be opened to receive the pipe P'. Then, the flat walls 13 and 13' cannot be completely overlapped when they are closed again after the pipe P' has been mounted. This failure slackens the clamping wall 12 so that the pipe P' is caused to lose its position through dislocation or release by the movement of the clamp device 11 when the device 11 is stored or transported. As a result, the arranging works of the clamping devices 11 on the assembly line in the field are troubled and delayed.

SUMMARY OF THE INVENTION

An object of the present invention is to provide a fixing clamp in which a clamp device having mounted a pipe in position is freed from any dislocation or release by a simple snapping operation.

According to the gist of the present invention, there is provided a slender pipe fixing clamp comprising a clamp device made of a metal strip and including: a clamping wall curved widthwise from the longitudinally central portion of said metal strip; and a pair of flat walls extending in a face-to-face relation from the two ends of said clamping wall and having mounting through holes generally registered with each other, wherein the improvement resides in that a retaining hole is formed in one of said flat walls in the vicinity of the root of said clamping wall whereas a retaining tongue is raised from the other of said flat walls such that it can be removably retained through said retaining hole.

With this structure of the present invention, the overlapping flat walls in the vicinity of the two ends of the clamp device are opened to mount the pipe in position. After this, the flat walls are closed again, and the retaining tongue is retained through the retaining hole to fix the outer circumference of the pipe.

BRIEF DESCRIPTION OF THE DRAWINGS

FIG. 1 is a top plan view showing the state in which a slender pipe fixing clamp according to one embodiment of the present invention is used to fix a pipe;

FIG. 2 is a section taken along line A—A of FIG. 1;

FIG. 3 is similar to FIG. 2 but shows another embodiment of the present invention;

FIG. 4 is similar to FIGS. 2 and 3 but shows still another embodiment of the present invention;

FIG. 5 is a perspective view showing a further embodiment of the present invention; and FIG. 6 is similar to FIGS. 2 to 4 but shows the slender pipe fixing clamp of the prior art.

DETAILED DESCRIPTION OF THE PREFERRED EMBODIMENTS

In FIGS. 1 to 5, reference numeral 1 generally designates a clamp device which is made of a short strip of a metal such as steel. This steel strip is widthwise curved at its longitudinally central portion to form a clamping wall 2 for clamping a slender pipe such as a metal pipe or a resin tube. In the vicinity of the two ends of the clamping wall 2, there are left a pair of flat walls 3 and 3' which extend in a face-to-face relation and which are formed mounting through holes 4 and 4' generally registered with each other for mounting the clamp device 1 therethrough by means of a bolt. Designated at numeral 5 is a retaining hole which is formed in the flat wall 3 or 3' in the vicinity of the root of the clamping wall 2. From the other flat wall 3' or 3, there is raised a retaining tongue 6 such that it can be removably retained through the retaining hole 5 when the pipe P is fixed in position.

The retaining tongue 6 may be formed by cutting the steel strip in the longitudinal direction, by once bending it upward and by bending the leading end of the bent tip generally in parallel with the flat walls 3 and 3', as shown in FIG. 2. After the cutting, on the other hand, the retaining tongue 6 may be formed by once bending the steel strip upward and by bending the leading end of the bent tip toward the clamping wall 2, as shown in FIG. 3. As shown in FIG. 4, moreover, the retaining tongue 6 may be formed, after the upward bending, by further cutting the central portion of the bent tip 6' and by bending the cut portion obliquely downward. On the other hand, the structure shown in FIG. 5 is similar to that of FIG. 2 but is modified such that the steel strip is cut in the transverse direction to form the retaining tongue 6.

In the slender pipe fixing clamp according to the present invention, as has been described hereinbefore, the removably retaining portions are formed in the vicinity of the root of the clamping wall 2. As a result, the pipe P can be fixed by simply retaining the tongue 6 through the hole 5 so that it can be freed from losing its position through dislocation or release by the movement of the clamp device 1 when the device 1 is stored or transported. As a result, the arranging works of the clamping devices 1 on the assembly line in the field are not troubled. Thus, the present invention provides a remarkably useful clamp for fixing a slender pipe.

What is claimed is:

1. A slender pipe fixing clamp comprising a clamp device made of a metal strip and including: a clamping wall curved widthwise from the longitudinally central portion of said metal strip; and first and second flat walls extending in a face-to-face relation from the two ends of said clamping wall and having mounting through holes generally registered with each other, wherein the improvement resides in that a first retaining hole is formed in said first flat wall in the vicinity of the root of said clamping wall and at a location spaced from the mounting through holes, a second retaining hole being formed in the clamping wall and whereas a retaining tongue is raised from said second flat wall at a location spaced from said mounting through holes and generally aligned with the first retaining hole such that said retaining tongue can be removably retained through said first retaining hole, said retaining tongue being formed to define a bent tip angularly aligned to the remaining portions of said retaining tongue and being securely engageable with the second retaining hole.

2. A slender pipe fixing clamp according to claim 1, wherein said retaining tongue is formed by cutting said metal strip in the longitudinally direction, by bending it upward and by bending the leading end of the bent tip generally in parallel with said flat walls.

3. A slender pipe fixing clamp according to claim 1, wherein said retaining tongue is formed by cutting said metal strip in the longitudinally direction, by bending it upward and by bending the leading end of the bent tip toward said clamping wall.

4. A slender pipe fixing clamp according to claim 1, wherein said retaining tongue is formed by cutting said metal strip in the longitudinally direction, by bending it upward, by cutting a central portion of the bent tip, and by bending the cut portion obliquely downward.

5. A slender pipe fixing clamp according to claim 1, wherein said retaining tongue is formed by cutting said metal strip in the transverse direction, by bending it upward and by bending the leading end of the bent tip generally in parallel with said flat walls.

6. A slender pipe fixing clamp according to claim 1, further comprising a pipe, wherein said pipe is made of a metal or a resin.

* * * * *